(12) United States Patent
Watanabe et al.

(10) Patent No.: US 9,698,601 B2
(45) Date of Patent: *Jul. 4, 2017

(54) VOLTAGE CONTROL APPARATUS, VOLTAGE CONTROL METHOD, AND POWER ADJUSTMENT APPARATUS

(71) Applicant: Panasonic Corporation, Osaka (JP)

(72) Inventors: Kenichi Watanabe, Osaka (JP); Junji Kondoh, Ibaraki (JP)

(73) Assignee: PANASONIC CORPORATION, Osaka (JP)

( * ) Notice: Subject to any disclaimer, the term of this patent is extended or adjusted under 35 U.S.C. 154(b) by 282 days.

This patent is subject to a terminal disclaimer.

(21) Appl. No.: 14/394,943

(22) PCT Filed: Apr. 3, 2013

(86) PCT No.: PCT/JP2013/002310
§ 371 (c)(1),
(2) Date: Oct. 16, 2014

(87) PCT Pub. No.: WO2013/157209
PCT Pub. Date: Oct. 24, 2013

(65) Prior Publication Data
US 2015/0069978 A1   Mar. 12, 2015

(30) Foreign Application Priority Data

Apr. 19, 2012 (JP) .................. 2012-095972

(51) Int. Cl.
*H02J 3/18* (2006.01)
*G05F 1/70* (2006.01)
*H02J 3/16* (2006.01)

(52) U.S. Cl.
CPC ............... *H02J 3/18* (2013.01); *G05F 1/70* (2013.01); *H02J 3/16* (2013.01); *Y02E 40/34* (2013.01)

(58) Field of Classification Search
CPC ...... G05F 1/70; H02J 3/16; H02J 3/18; Y02E 40/34
See application file for complete search history.

(56) References Cited

U.S. PATENT DOCUMENTS 8,716,888 B2 * 5/2014 Watanabe ............. H02J 3/1885
307/42
2012/0280673 A1   11/2012 Watanabe et al.
(Continued)

FOREIGN PATENT DOCUMENTS

JP   2000-69668   3/2000
JP   2002-51466   2/2002
(Continued)

OTHER PUBLICATIONS

International Search Report issued May 24, 2013 in International Application No. PCT/JP2013/002310.

*Primary Examiner* — Miranda Huang
*Assistant Examiner* — John Park
(74) *Attorney, Agent, or Firm* — Wenderoth, Lind & Ponack, L.L.P.

(57) ABSTRACT

A voltage control apparatus includes: a voltage value obtainment unit configured to obtain voltage values at the one or more voltage measuring points; an impedance obtainment unit configured to obtain a system impedance from a distribution substation to each of power adjustment apparatuses; a control variable calculating unit configured to calculate a control variable including at least one of (i) a value corresponding to an allowable upper limit of a voltage value at the first voltage measuring point and (ii) a value corresponding to an allowable lower limit of the voltage value at the first voltage measuring point, based on the voltage values at the one or more voltage measuring points and the system impedances; and a notification unit configured to notify the (Continued)

power adjustment apparatuses of the calculated control variable.

13 Claims, 9 Drawing Sheets

(56) References Cited

U.S. PATENT DOCUMENTS

| | | | | |
|---|---|---|---|---|
| 2013/0134779 A1* | 5/2013 | Watanabe | ............... | G05F 1/70 307/24 |
| 2015/0005979 A1* | 1/2015 | Itaya | ..................... | H02J 3/16 700/298 |

FOREIGN PATENT DOCUMENTS

| | | |
|---|---|---|
| JP | 2002-281669 | 9/2002 |
| JP | 2003-18748 | 1/2003 |
| JP | 2005-57821 | 3/2005 |
| JP | 4019150 | 12/2007 |
| JP | 2009-124913 | 6/2009 |
| JP | 2009-207225 | 9/2009 |
| WO | 2011/135822 | 11/2011 |

\* cited by examiner

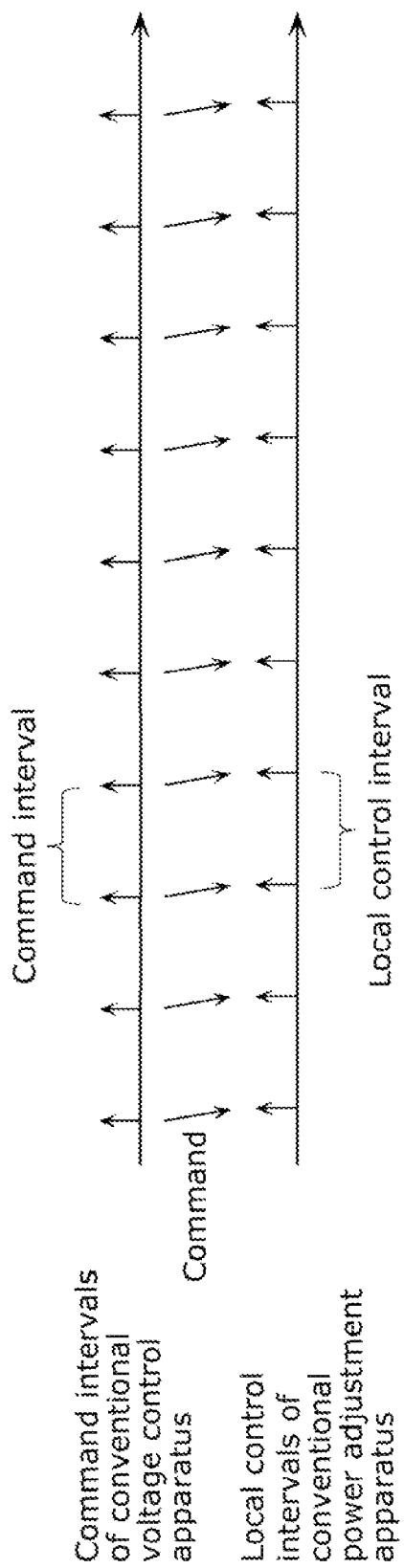

VOLTAGE CONTROL APPARATUS, VOLTAGE CONTROL METHOD, AND POWER ADJUSTMENT APPARATUS

TECHNICAL FIELD

The present invention relates to a voltage control apparatus, a voltage control method, and a power adjustment apparatus, and in particular, to a voltage control apparatus and others that calculate a control variable for controlling a voltage of a distribution system interconnected to distributed generations.

BACKGROUND ART

Patent Literature (PTL) 1 discloses a technique for a controller to collect information on reactive power and voltages from each distributed generation, and calculate, based on the collected information, reactive power of each of the distributed generations or a reactive power regulator to minimize a residual sum of squares with respect to a central value of a specified range for voltages at each voltage monitoring point.

CITATION LIST

Patent Literature

[PTL 1] Japanese Patent No. 4019150

SUMMARY OF INVENTION

Technical Problem

However, if transmission intervals of a control variable for controlling voltages to be transmitted from the controller to each of the distributed generations do not match control intervals of the distributed generations, the voltage at each of the voltage monitoring points cannot be appropriately controlled according to the technique disclosed in PTL 1.

Thus, the present invention has an object of providing a voltage control apparatus that appropriately controls voltages when the control variable is transmitted at intervals longer than the control intervals of power adjustment apparatuses such as distributed generations.

Solution to Problem

In order to achieve the object, a voltage control apparatus according to an aspect of the present invention is a voltage control apparatus that adjusts voltages at one or more voltage measuring points provided in a distribution system to prevent the voltages from deviating from a predetermined voltage range by controlling power adjustment apparatuses, the voltage control apparatus including: a voltage value obtainment unit configured to obtain voltage values at the one or more voltage measuring points including a first voltage measuring point connected to a corresponding one of the power adjustment apparatuses; an impedance obtainment unit configured to obtain a system impedance from a distribution substation to each of the power adjustment apparatuses in the distribution system; a control variable calculating unit configured to calculate a control variable including at least one of (i) a value corresponding to an allowable upper limit of a voltage value at the first voltage measuring point and (ii) a value corresponding to an allowable lower limit of the voltage value at the first voltage measuring point, based on the voltage values at the one or more voltage measuring points and the system impedances; and a notification unit configured to notify the power adjustment apparatuses of the calculated control variable.

These general and specific aspects may be implemented using a system, a method, an integrated circuit, a computer program, a recording medium, or any combination of systems, methods, integrated circuits, computer programs, and recording media.

Advantageous Effects of Invention

Even when a control variable is transmitted at intervals longer than the control intervals of the power adjustment apparatuses, a voltage control apparatus that appropriately controls a voltage at each voltage monitoring point can be provided.

BRIEF DESCRIPTION OF DRAWINGS

FIG. 4A illustrates command intervals of a conventional voltage control apparatus and local control intervals of a conventional power adjustment apparatus.

Figure 1:
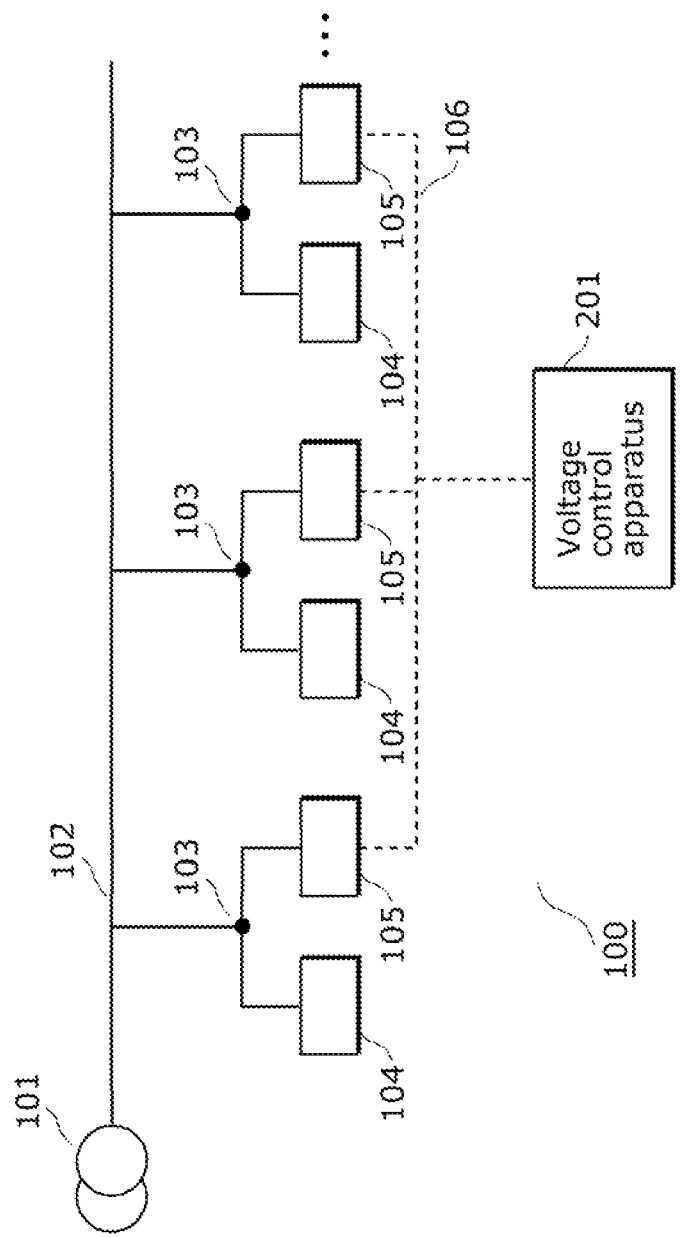
FIG. 1 illustrates a configuration of a distribution system according to Embodiment.

DESCRIPTION OF EMBODIMENTS (Underlying Knowledge Forming Basis of the Present Invention)

The inventors have found that the voltage control apparatus described in the Background Art has the following problems.

In recent years, office buildings and houses have introduced distributed generations such as solar power systems. The surplus electric power of the power generated by the distributed generations flows back to a distribution system, and is sold to electric power companies. However, when a large number of distributed generations are interconnected to a distribution system, the reverse power flow and the simultaneous disconnection of the distributed generations may cause voltages of the distribution system to deviate from the proper voltage range for low voltage consumers ($101 \pm 6V$, $202 \pm 20V$) specified in the grid-interconnection code.

One of the methods for controlling a voltage to fall within the proper voltage range is to control the voltage by adjusting reactive power. More specifically, the method is, when a voltage at a point of common coupling connected to an apparatus that can adjust the reactive power (hereinafter referred to as "power adjustment apparatus") deviates from the proper voltage range, the power adjustment apparatus controls, with input and output of reactive power, the voltage at the point of common coupling, using a line impedance (mainly, reactance component) of a power distribution line. Each of the power adjustment apparatuses includes at least one of a power conditioner with a distributed generation (hereinafter referred to as "distributed generation"), a static var compensator (SVC), and a phase modifier.

Such power adjustment apparatuses are roughly divided into known two types, local control type and coordination control type.

Since each of the power adjustment apparatuses of the local control type controls voltages independently from other power adjustment apparatuses, it cannot control voltages in an integrated manner. In order to cope with such a problem, for example, each of the power adjustment apparatuses of the coordination control type disclosed in PTL 1 includes a voltage control apparatus. The voltage control apparatus collects information on reactive power and voltages from each of the power adjustment apparatuses via a communication network. The voltage control apparatus calculates, based on the collected information, reactive power of the distributed generations and/or the reactive power regulators to minimize a residual sum of squares with respect to a central value of a specified range of voltages at voltage monitoring points. Accordingly, the reactive power of the power adjustment apparatuses can be determined so that the voltage distribution of the distribution system falls within the specified range.

However, the power adjustment apparatuses of the coordination control type control voltages so that the voltages conform to a control variable obtained from the voltage control apparatus. Thus, when intervals of transmitting the control variable from the voltage control apparatus to each of the power adjustment apparatuses do not match control intervals of the power adjustment apparatuses, the voltages cannot be appropriately controlled. For example, when each of the power adjustment apparatuses cannot obtain a control variable from the voltage control apparatus for a certain period of time due to congestion of a communication network, each of the power adjustment apparatuses cannot appropriately control the voltages. As a result, the voltage at a point of common coupling may deviate from the proper range.

In order to solve such problems, a voltage control apparatus according to an aspect of the present invention is a voltage control apparatus that adjusts voltages at one or more voltage measuring points provided in a distribution system to prevent the voltages from deviating from a predetermined voltage range by controlling power adjustment apparatuses, the voltage control apparatus including: a voltage value obtainment unit configured to obtain voltage values at the one or more voltage measuring points including a first voltage measuring point connected to a corresponding one of the power adjustment apparatuses; an impedance obtainment unit configured to obtain a system impedance from a distribution substation to each of the power adjustment apparatuses in the distribution system; a control variable calculating unit configured to calculate a control variable including at least one of (i) a value corresponding to an allowable upper limit of a voltage value at the first voltage measuring point and (ii) a value corresponding to an allowable lower limit of the voltage value at the first voltage measuring point, based on the voltage values at the one or more voltage measuring points and the system impedances; and a notification unit configured to notify the power adjustment apparatuses of the calculated control variable.

Accordingly, each of the power adjustment apparatuses can autonomously control the voltage to fall within the upper and lower limits obtained from the voltage control apparatus. Thus, transmission intervals of a control variable to be transmitted from the voltage control apparatus to the power adjustment apparatuses can be extended. As a result, appropriate voltage control is possible even when a control variable is transmitted at intervals longer than the control intervals of the power adjustment apparatuses.

Furthermore, the distribution system may include the one or more voltage measuring points, the one or more voltage measuring points may include the first voltage measuring point, and a second voltage measuring point that is not connected to a corresponding power adjustment apparatus among the power adjustment apparatuses, and the control variable calculating unit may be configured to calculate the control variable to prevent the voltage value at the first voltage measuring point and a voltage value at the second voltage measuring point from deviating from the predetermined voltage range.

Accordingly, the voltage control apparatus can control the voltage at the voltage measuring point to which the power adjustment apparatus is not connected.

Specifically, the control variable calculating unit may be configured to: calculate a change in a reactive power value to be output by each of the power adjustment apparatuses, based on the voltage values at the one or more voltage measuring points and the system impedances to prevent the voltage values from deviating from the predetermined voltage range; calculate the voltage value at the first voltage measuring point connected to the corresponding one of the power adjustment apparatuses, when the power adjustment apparatus outputs the calculated change in the reactive power value; determine the calculated voltage value at the first voltage measuring point to be the value corresponding to the possible lower limit of the voltage value at the first voltage measuring point, when the output of the change in the reactive power value increases the voltage at the first voltage measuring point; and determine the calculated voltage value at the first voltage measuring point to be the value corresponding to the possible upper limit of the voltage value at the first voltage measuring point, when the output of the change in the reactive power value decreases the voltage at the first voltage measuring point.

Accordingly, the upper limit or the lower limit of the control variable can be appropriately determined using the change in the reactive power value to be output by each of the power adjustment apparatuses.

Furthermore, the control variable calculating unit may be configured to: calculate a change in a reactive power value to be output by each of the power adjustment apparatuses, based on the voltage values at the one or more voltage measuring points and the system impedances to prevent the voltage values from deviating from the predetermined voltage range; calculate (i) the voltage value at the first voltage measuring point connected to the corresponding one of the power adjustment apparatuses and (ii) a change in the voltage value at the first voltage measuring point, when the power adjustment apparatus outputs the calculated change in the reactive power value; determine the calculated voltage value at the first voltage measuring point to be the value corresponding to the possible lower limit of the voltage value at the first voltage measuring point, when the change in the voltage value increases the voltage at the first voltage measuring point; and determine the calculated voltage value at the first voltage measuring point to be the value corresponding to the possible upper limit of the voltage value at the first voltage measuring point, when the change in the voltage value decreases the voltage at the first voltage measuring point.

Accordingly, the upper limit or the lower limit of the control variable can be appropriately determined using the change in the voltage value to be output by each of the power adjustment apparatuses.

Furthermore, when calculating, as the control variable, (i) the value corresponding to the possible upper limit of the voltage value at the first voltage measuring point and (ii) the value corresponding to the possible lower limit of the voltage value at the first voltage measuring point, the control variable calculating unit may be configured to: determine a lower limit of the predetermined voltage range to be the value corresponding to the possible lower limit, in the case where the value corresponding to the possible upper limit is first calculated; and determine an upper limit of the predetermined voltage range to be the value corresponding to the possible upper limit, in the case where the value corresponding to the possible lower limit is first calculated.

Accordingly, the control variable calculating unit can appropriately determine both of the upper limit and the lower limit.

Furthermore, the control variable calculating unit may be configured to: determine an upper limit of the predetermined voltage range to be the value corresponding to the possible upper limit, when the value corresponding to the possible upper limit exceeds the upper limit of the predetermined voltage range; and determine a lower limit of the predetermined voltage range to be the value corresponding to the possible lower limit, when the value corresponding to the possible lower limit falls below the lower limit of the predetermined voltage range.

Furthermore, the control variable calculating unit may be configured to calculate at least one of the value corresponding to the possible upper limit and the value corresponding to the possible lower limit to further expand an allowable voltage range indicated by the control variable, when the voltage values at the one or more voltage measuring points fall within the predetermined voltage range and at least one of the power adjustment apparatuses inputs and outputs reactive power.

Accordingly, the magnitude of an absolute value of reactive power to be output by each of the power adjustment apparatuses can be reduced.

Furthermore, the control variable calculating unit may be configured to calculate, as the control variable, at least one of an allowable lower limit and an allowable upper limit of a reactive power value to be output by the corresponding one of the power adjustment apparatuses connected to the first voltage measuring point.

A power adjustment apparatus according to an aspect of the present invention is a power adjustment apparatus including: a local voltage value obtainment unit configured to obtain a voltage value at a first voltage measuring point; a communication unit configured to receive a control variable including at least one of (i) a value corresponding to an allowable upper limit of a voltage value at the first voltage measuring point and (ii) a value corresponding to an allowable lower limit of the voltage value at the first voltage measuring point, from the voltage control apparatus; a control unit configured to determine a reactive power value to be output so that the voltage value obtained by the local voltage value obtainment unit falls within a voltage value range, when the voltage value obtained by the local voltage value obtainment unit deviates from the voltage value range, the voltage value range being indicated by the control variable received by the communication unit; and an input and output adjustment unit configured to adjust reactive power to be output, based on the reactive power value determined by the control unit.

Accordingly, a voltage value at a voltage measuring point can be adjusted according to a control variable including at least one of the upper limit and the lower limit obtained from the voltage control apparatus.

Furthermore, the control unit may be further configured to determine an active power value to be output so that the voltage value obtained by the local voltage value obtainment unit falls within the voltage value range, when the voltage value obtained by the local voltage value obtainment unit deviates from the voltage value range, the voltage value range being indicated by the control variable received by the communication unit, and the input and output adjustment unit may be configured to adjust active power to be output, based on the active power value determined by the control unit.

A voltage control method according to an aspect of the present invention is a voltage control method for adjusting voltages at one or more voltage measuring points provided in a distribution system to prevent the voltages from deviating from a predetermined voltage range by controlling power adjustment apparatuses, the voltage control method including: obtaining voltage values at the one or more voltage measuring points including a first voltage measuring point connected to a corresponding one of the power adjustment apparatuses; obtaining a system impedance from a distribution substation to each of the power adjustment apparatuses in the distribution system; calculating a control variable including at least one of (i) a value corresponding to an allowable upper limit of a voltage value at the first voltage measuring point and (ii) a value corresponding to an allowable lower limit of the voltage value at the first voltage measuring point, based on the voltage values at the one or more voltage measuring points and the system impedances; and notifying the power adjustment apparatuses of the calculated control variable.

These general and specific aspects may be implemented using a system, a method, an integrated circuit, a computer program, a recording medium, or any combination of systems, methods, integrated circuits, computer programs, and recording media.

Hereinafter, Embodiment of the present invention will be hereinafter described with reference to the drawings. Embodiment to be described below shows all general or specific examples. The values, shapes, constituent elements, positions and connections of the constituent elements, steps, and orders of the steps indicated in Embodiment are examples, and do not limit the present invention.

The constituent elements in Embodiment that are not described in independent Claims that describe the most generic concept of the present invention are described as arbitrary constituent elements.

Embodiment

FIG. 1 conceptually illustrates a distribution system 100 including a voltage control apparatus 201 according to Embodiment.

As Illustrated in FIG. 1, the distribution system 100 includes a distribution substation 101 (hereinafter also referred to as "substation"), a distribution line 102, voltage measuring points (voltage monitoring points) 103, loads 104, power adjustment apparatuses 105, a communication line 106, and the voltage control apparatus 201. FIG. 1 shows that the distribution substation 101 is more distant as approaching from the left to the right in FIG. 1.

Furthermore, among the voltage measuring points 103, a voltage measuring point connected to a corresponding one of the power adjustment apparatuses 105 is called a first voltage measuring point. In the distribution system 100 in FIG. 1, each of the voltage measuring points 103 is connected to a corresponding one of the power adjustment apparatuses 105. Thus, all the voltage measuring points 103 are the first voltage measuring points in FIG. 1.

The power output from the distribution substation 101 is supplied to each of the loads 104 through the distribution line 102 and a corresponding one of the voltage measuring points 103. Furthermore, the active power output from each of the power adjustment apparatuses 105 is supplied to the load 104, and the surplus electric power from the active power is supplied to the distribution line 102 through the voltage measuring point 103.

The voltage measuring point 103 is a point at which a voltage value is detected. For example, the voltage measuring point 103 is a point at which the power adjustment apparatus 105 measures a voltage, a point at which the power adjustment apparatus 105 can obtain a voltage value from a voltage sensor using communication and others, a connection point, or others. Here, the connection point is a point of common coupling at which each of the power adjustment apparatuses 105 is interconnected to the distribution system 100.

In FIG. 1, the voltage measuring points 103 are the connection points. Furthermore, each of the voltage measuring points 103 is connected in association with the load 104 and the power adjustment apparatus 105. Furthermore, each of the power adjustment apparatuses 105 measures a voltage value at a corresponding one of the voltage measuring points 103.

The loads 104 are, for example, loads set for the voltage consumers. Assuming the loads 104 as the power adjustment apparatuses, the voltage at each of the voltage measuring points 103 can be adjusted by causing the loads 104 to control the power consumption. However, the loads 104 are not controlled herein to simplify the description of Embodiment.

The power adjustment apparatuses 105 are, for example, distributed generations, SVCs, or phase modifiers. Here, examples of the distributed generations include distributed power generation systems, such as solar power systems and fuel cell systems, and distributed electricity energy storage systems, such as secondary battery systems.

The distributed generation includes, for example, a solar battery, a power generator such as a fuel cell, a storage such as a secondary battery, and a power conditioner that performs DC/AC conversion on DC power generated by the power generator or the storage.

Each of the power adjustment apparatuses 105 controls the magnitude of the voltage at the corresponding voltage measuring point (that is, the first voltage measuring point) with input and output of reactive power to and from the distribution system. Although the current grid-interconnection code bans the input of reactive power by the distributed generations, the distributed generations input reactive power according to Embodiment.

Furthermore, when the power adjustment apparatuses 105 output reactive power to the distribution system, the output of the reactive power is positive. When the distribution system inputs reactive power to the power adjustment apparatuses 105, output of the reactive power is negative. Thus, the power adjustment apparatus 105 controls the voltage value at the voltage measuring point 103 by outputting the positive or negative reactive power to the distribution system.

Furthermore, when the power adjustment apparatuses 105 output active power to the distribution system, the output of the active power is positive. When the power adjustment apparatuses 105 consume the active power, output of the active power is negative. Thus, the power adjustment apparatuses 105 control the voltage values at the voltage measuring points 103 with output of the positive and negative active powers to the distribution system.

The voltage control apparatus 201 is a control apparatus that controls at least one of the power adjustment apparatuses 105 so that the voltage at the voltage measuring point 103 falls within the proper range. More specifically, the voltage control apparatus 201 controls the power adjustment apparatuses 105 to adjust the voltages at the one or more voltage measuring points 103 provided in the distribution system and prevent the voltages from deviating from a predetermined voltage range.

The communication line 106 is a communication means for exchanging data between the voltage control apparatus 201 and each of the power adjustment apparatuses 105. Examples of the communication line 106 include the Internet, power line communication (PLC), and wireless communication using a predetermined frequency band, such as 950 MHz. Although not illustrated in FIG. 1, the communication line 106 can be provided between the voltage control apparatus 201 and the loads 104.

Next, the voltage control apparatus 201 will be described in detail with reference to FIGS. 2 and 3.

Figure 2:
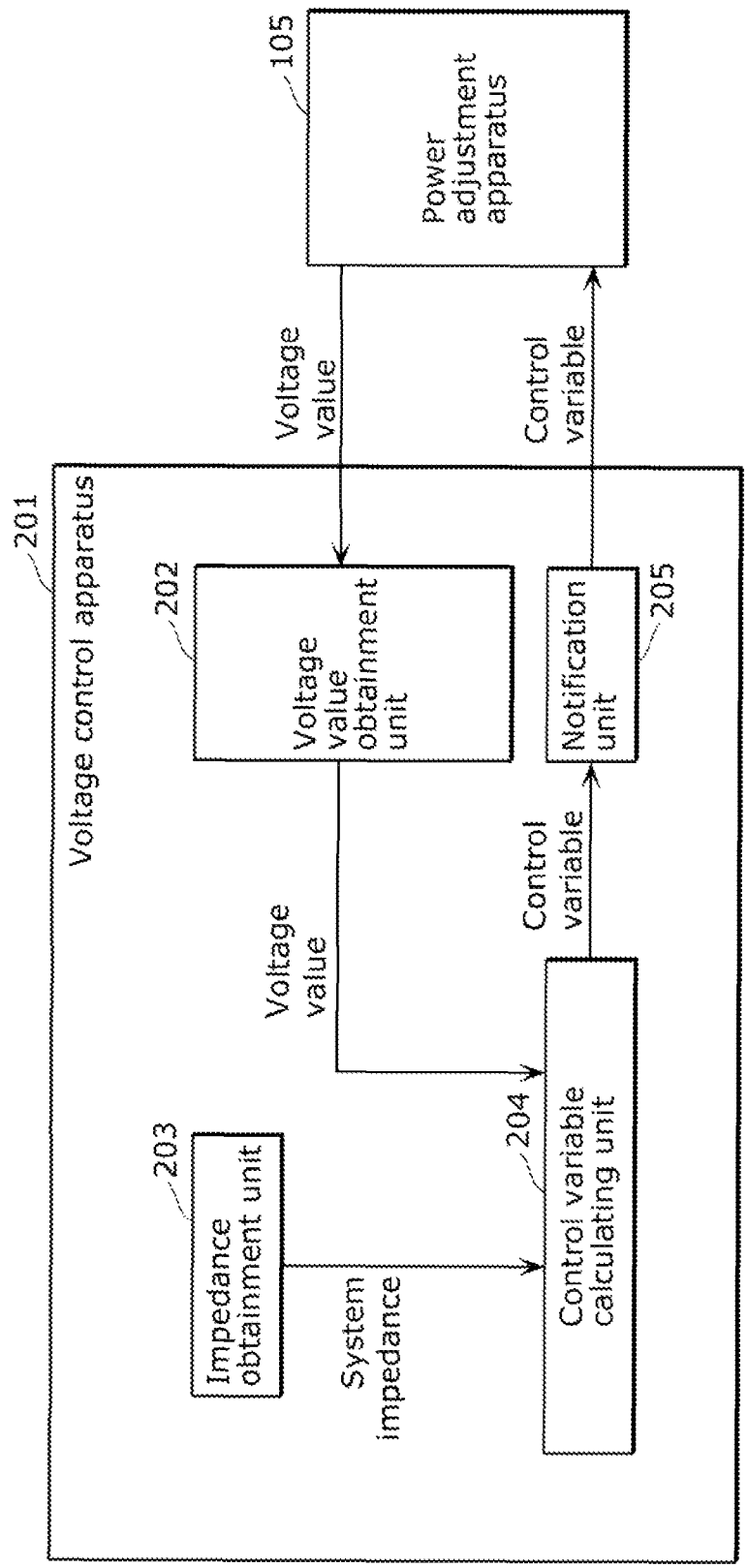
FIG. 2 is a block diagram of a voltage control apparatus according to Embodiment.

FIG. 2 is a functional block diagram of the voltage control apparatus 201 according to Embodiment.

As illustrated in FIG. 2, the voltage control apparatus 201 includes a voltage value obtainment unit 202, an impedance obtainment unit 203, a control variable calculating unit 204, and a notification unit 205.

The voltage value obtainment unit 202 obtains voltage values at one or more voltage measuring points from the power adjustment apparatuses 105 through the communication line 106, and outputs the voltage values to the control variable calculating unit 204. The voltage value obtainment unit 202 can obtain a voltage value from a unit except for the power adjustment apparatuses 105.

The impedance obtainment unit 203 obtains a system impedance from the distribution substation 101 to the power adjustment apparatus 105 in the distribution system 100, and outputs the system impedance to the control variable calculating unit 204. Furthermore, the impedance obtainment unit 203 obtains a system impedance from the distribution substation 101 to each of the power adjustment apparatuses 105.

The system impedance may be obtained from a server managed or operated by an electric power company. Furthermore, the system impedance may be obtained from each of the power adjustment apparatuses 105 through the communication line 106. Furthermore, a predetermined system impedance may be stored in, for example, a Read Only Memory (ROM) included in the voltage control apparatus 201, and the impedance obtainment unit 203 may read the value. Furthermore, the methods for obtaining a system impedance by the impedance obtainment unit 203 are not limited to these.

The control variable calculating unit 204 calculates a control variable including at least one of (a) a value corresponding to an allowable upper limit of a voltage value at a first voltage measuring point and (b) a value corresponding to an allowable lower limit of the voltage value at the first voltage measuring point, based on the voltage values at the one or more voltage measuring points 103 and the system impedances.

Specifically, the control variable calculating unit 204 obtains a voltage value at each of the voltage measuring points 103, from the voltage value obtainment unit 202. Furthermore, the control variable calculating unit 204 obtains the system impedances from the impedance obtainment unit 203. Next, the control variable calculating unit 204 calculates, using the voltage value at each of the voltage measuring points 103 and the system impedances, a change in reactive power value to be output from each of the power adjustment apparatuses 105 so that the voltages at the voltage measuring points 103 fall within a predetermined voltage range. Furthermore, the control variable calculating unit 204 calculates a control variable by determining at least one of the value corresponding to the upper limit and the value corresponding to the lower limit of the voltage at each of the voltage measuring points 103, according to the calculated change in reactive power value.

The upper limit determined by the control variable calculating unit 204 is less than the upper limit of a predetermined voltage range. Similarly, the lower limit is less than the lower limit of the predetermined voltage range. Here, the predetermined voltage range is, for example, the proper voltage range for low voltage consumers (101±6V, 202±20V) specified in the grid-interconnection code in Japan.

The notification unit 205 notifies the power adjustment apparatuses 105 of the control variable calculated by the control variable calculating unit 204 to cause a corresponding one of the power adjustment apparatuses 105 to control the voltage value at the first voltage measuring point.

Figure 3:
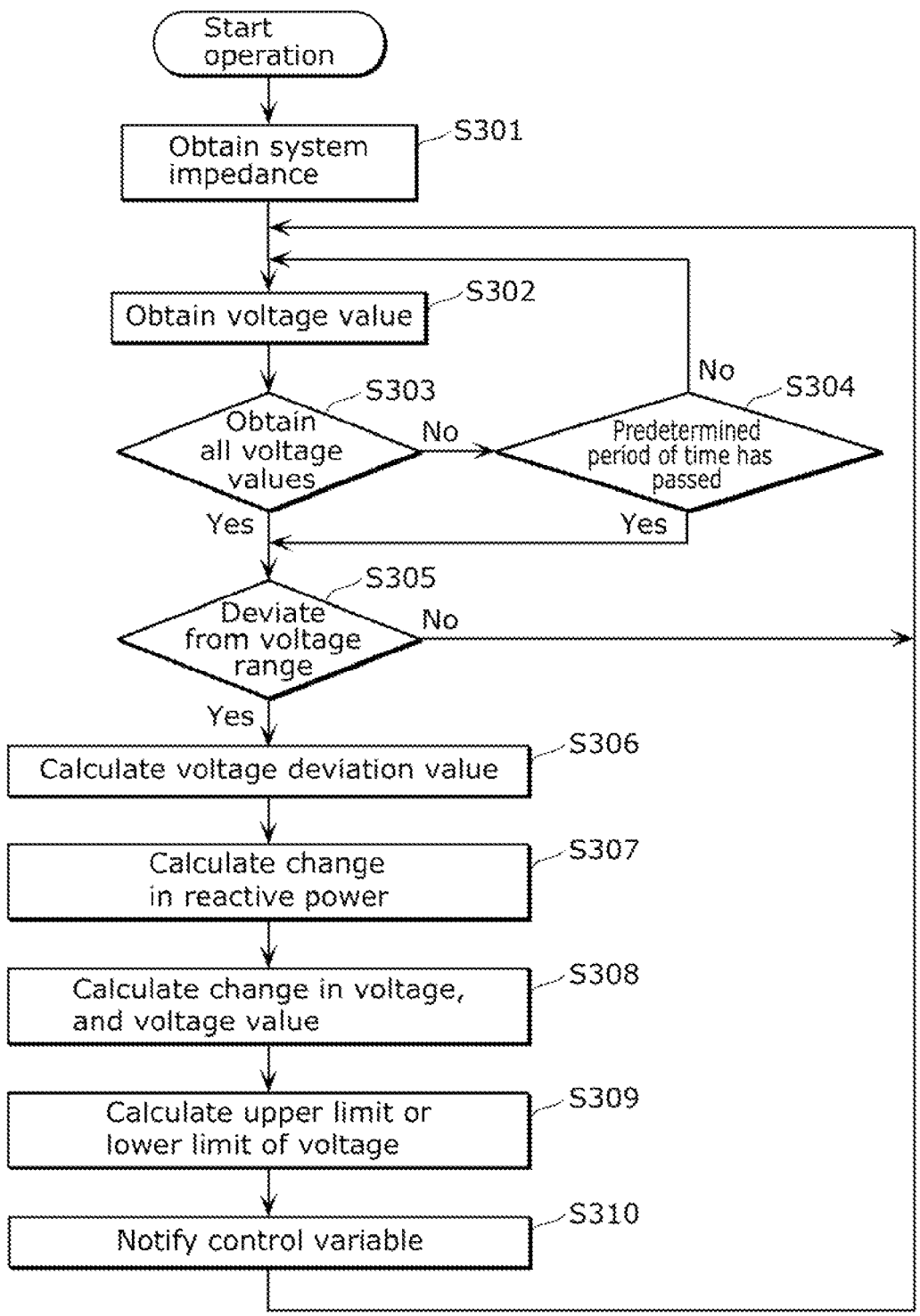
FIG. 3 is a flowchart of procedure of processing performed by the voltage control apparatus according to Embodiment.

FIG. 3 is a flowchart indicating an example of processing performed by the voltage control apparatus 201.

First, the impedance obtainment unit 203 obtains a system impedance from the distribution substation 101 to each of the power adjustment apparatuses 105 in the distribution system 100 (S301). In FIG. 3, the impedance obtainment unit 203 obtains the system impedances only once. However, the impedance obtainment unit 203 may obtain the system impedances when the distribution system is installed, or regularly.

Next, the voltage value obtainment unit 202 obtains, through the communication line 106, a voltage value at the voltage measuring point 103 measured by the power adjustment apparatus 105 using a voltage sensor (S302). Then, the voltage value obtainment unit 202 determines whether or not all the voltage values at the voltage measuring points 103 have been obtained (S303). Here, when the voltage measuring point 103 at which the voltage value obtainment unit 202 obtains the voltage value remains (No at S303), unless a predetermined period of time has passed since obtainment of the voltage value at S302 (No at S304), the voltage value obtainment unit 202 continues to obtain the voltage value at the voltage measuring point 103 (S302).

When the voltage value obtainment unit 202 obtains the voltage values measured at all of the voltage measuring points 103 (Yes at S303) or the predetermined period of time has passed since Step S302 (Yes at S304), the control variable calculating unit 204 determines whether or not the obtained voltage values deviate from a predetermined voltage range (S305).

When all of the obtained voltage values fall within the predetermined voltage range (No at S305), the processes proceed to Step S302.

When the obtained one or more voltage values deviate from the predetermined voltage range (Yes at S305), the control variable calculating unit 204 calculates a voltage deviation value of the voltage value at the voltage measuring point, from the upper limit or the lower limit of the predetermined voltage range (S306).

According to Embodiment, the voltage control apparatus 201 receives the voltage values from the power adjustment apparatuses 105. However, the voltage control apparatus 201 may receive the voltage deviation value of the voltage value at the voltage measuring point, from the upper limit or the lower limit of the predetermined voltage range. Accordingly, the process at Step S306 can be omitted.

Next, the control variable calculating unit 204 calculates a change in a reactive power value to be output from each of the power adjustment apparatuses 105, based on voltage values at the one or more voltage measuring points 103 and the system impedances so that the voltage values fall within a predetermined voltage range and a sum of absolute values of reactive powers to be output from the power adjustment apparatuses 105 falls below a predetermined value.

More specifically, the control variable calculating unit 204 calculates the change in reactive power value to be output from each of the power adjustment apparatuses 105 under constraints indicated by the following Equations (1) and (2), using the obtained voltage values and system impedances (S307). The object function is a sum of reactive powers to be output from all of the power adjustment apparatuses 105 connected to the voltage control apparatus 201. In other words, the objective function is a sum of absolute values of reactive powers to be output from all of the power adjustment apparatuses 105 connected to the voltage control apparatus 201. Furthermore, the objective function may be a sum of squares of reactive powers to be output from all of the power adjustment apparatuses 105 connected to the voltage control apparatus 201. According to Embodiment, $\Delta Q_i$ In Equations (1) and (2) is calculated so that the value of this objective function is the minimum. In calculating the solutions ($\Delta Q_i$) to Equations (1) and (2), for example, a linear programming or a nonlinear programming is used. Furthermore, the solutions ($\Delta Q_i$) to Equations (1) and (2) may be calculated so that a value of an objective function falls below a predetermined threshold instead of using the minimum value of the objective function.

[Math. 1]
$$\sum_{i=1}^{n} \alpha_{hi} \cdot \Delta Q_i \leq \Delta V_h \qquad \text{Equation (1)}$$

[Math. 2]
$$\Delta Q_{i\_min} \leq \Delta Q_i \leq \Delta Q_{i\_max} \qquad \text{Equation (2)}$$

Here, n denotes the number of the power adjustment apparatuses. Furthermore, $\Delta Q_i$ denotes a change in reactive power to be output by the power adjustment apparatus identified by an identifier i. Furthermore, $\Delta V_h$ denotes a voltage control quantity at a voltage measuring point. Here, $\Delta V_h$=(upper (lower) limit of a predetermined voltage range)−(voltage value $V_h$ of the voltage measuring point 103). In addition, h is an identifier representing the voltage measuring point 103 to be controlled (voltage value deviates from a predetermined voltage range) among the voltage measuring points 103. Specifically, h can satisfy 1≤h≤m indicating the number of voltage measuring points. Thus, Equation (1) is present as many as m indicating the number of voltage measuring points at each of which the voltage value deviates from a predetermined voltage range.

Although h is the identifier representing the voltage measuring point 103 to be controlled (voltage value deviates from a predetermined voltage range) according to Embodiment, it may be an Identifier representing all of the voltage measuring points 103.

Furthermore, $\alpha_{hi}$ is a coefficient representing control sensitivity (=$dV_h/dQ_i$), and is calculated based on the system impedances obtained by the impedance obtainment unit 203. Specifically, for example, $\alpha_{hi}$ can be calculated by the following Equation (3).

[Math. 3]

$$\alpha_{hi} = -\frac{\min(x_i, x_h)}{V_h} \quad \text{Equation (3)}$$

Here, $x_i$ denotes a value of reactance component of the system impedances obtained by the impedance obtainment unit 203, and is a reactance from the distribution substation 101 to the power adjustment apparatus 105 identified by the identifier i. Furthermore, $x_h$ denotes a reactance from the distribution substation 101 to the voltage measuring point 103 identified by an identifier h.

Here, $\alpha_{hi}$ can be determined by measuring a voltage change $\Delta V_h$ at the voltage measuring point 103 identified by the identifier h when the power adjustment apparatus 105 identified by the identifier i changes output of reactive power by $\Delta Q_i$.

Furthermore, $\Delta Q_{i\_max}$ denotes the maximum value of the change in reactive power. Furthermore, $\Delta Q_{i\_min}$ denotes the minimum value of the change in reactive power. Thus, Equation (2) is present as many as n indicating the number of the power adjustment apparatuses 105.

According to Embodiment, m=n because each of the voltage measuring points is connected to a corresponding one of the power adjustment apparatuses 105.

Next, the control variable calculating unit 204 calculates a voltage value at the first voltage measuring point corresponding to the power adjustment apparatus 105 that outputs the calculated change in reactive power value $\Delta Q_i$. Specifically, the control variable calculating unit 204 calculates the change in voltage and the voltage value at the voltage measuring point 103 when the power adjustment apparatus 105 outputs the change in reactive power $\Delta Q_i$ calculated at Step S307, using the following Equations (4) and (5) (S308).

[Math. 4]

$$\Delta V_j = \sum_{i=1}^{n} \alpha_{ji} \cdot \Delta Q_i \quad \text{Equation (4)}$$

[Math. 5]

$$V_{j\_new} = V_{j\_old} + \Delta V_j \quad \text{Equation (5)}$$

Here, n denotes the number of the power adjustment apparatuses 105. Furthermore, $\Delta Q_i$ denotes the change in reactive power (a) to be output by the power adjustment apparatus identified by an identifier i and (b) calculated at Step S307. Furthermore, $\alpha_{ji}$ is a coefficient representing control sensitivity (=$dV_j/dQ_i$). Furthermore, $\Delta V_j$ denotes a change in voltage at the voltage measuring point 103 when the change in reactive power calculated at Step S307 is output. Here, j is an identifier representing the voltage measuring point 103. Furthermore, Equation (4) is present as many as m indicating the number of the voltage measuring points 103.

According to Embodiment, m=n because each of the voltage measuring points is connected to a corresponding one of the power adjustment apparatuses 105.

Furthermore, $V_{j\_old}$ denotes a voltage value at an immediately preceding voltage measuring point. Furthermore, $V_{j\_new}$ denotes a voltage value at a voltage measuring point when the power adjustment apparatus 105 outputs the change in reactive power calculated at Step S307. Here, Equation (5) is present as many as m indicating the number of the voltage measuring points (m=n according to Embodiment) as Equation (4).

Next, when output of the change in reactive power value $\Delta Q_i$ increases the voltage at the corresponding first voltage measuring point, the control variable calculating unit 204 determines the calculated voltage value at the first voltage measuring point to be the possible lower limit of the voltage value at the first voltage measuring point.

Furthermore, when output of the change in reactive power value $\Delta Q_i$ decreases the voltage at the corresponding first voltage measuring point, the control variable calculating unit 204 determines the calculated voltage value at the first voltage measuring point to be the possible upper limit of the voltage value at the first voltage measuring point.

Specifically, the control variable calculating unit 204 calculates one of the upper limit and the lower limit of the voltage at each of the first voltage measuring points as a control variable, based on the change in reactive power $\Delta Q_i$ calculated at Step S307 using the following Equation (6) (S309).

[Math. 6]

$$V_{j\_up}=V_{j\_new}, V_{j\_low}=V_{j\_min} \text{ if } \Delta Q_i > 0$$

$$V_{j\_up}=V_{j\_max}, V_{j\_low}=V_{j\_new} \text{ else} \quad \text{Equation (6)}$$

Here, $V_{j\_up}$ denotes an upper limit at the voltage measuring point j. Furthermore, $V_{j\_low}$ denotes a lower limit at the voltage measuring point j. Furthermore, $V_{j\_max}$ denotes an upper limit of a predetermined voltage range. Furthermore, $V_{j\_min}$ denotes a lower limit of the predetermined voltage range. Furthermore, $V_{j\_new}$ denotes a voltage value at a voltage measuring point calculated at Step S308 when the change in reactive power is output. Furthermore, $\Delta Qi$ denotes the change in reactive power (a) to be output by the power adjustment apparatus identified by an identifier and (b) calculated at Step S307.

Specifically, when calculating, as the control variable, (i) the value corresponding to the possible upper limit of the voltage value at the first voltage measuring point and (ii) the value corresponding to the possible lower limit of the voltage value at the first voltage measuring point, the control variable calculating unit 204: determines a lower limit of the predetermined voltage range to be the value corresponding to the possible lower limit, in the case where the value corresponding to the possible upper limit is first calculated; and determines an upper limit of the predetermined voltage range to be the value corresponding to the possible upper limit, in the case where the value corresponding to the possible lower limit is first calculated.

At Step S309, the control variable calculating unit 204 may calculate the upper limit or the lower limit of the voltage at each of the voltage measuring points as a control variable, based on the change in voltage $\Delta V_j$ at the voltage measuring point calculated at Step S308, using the following Equation (7) instead of Equation (6).

[Math. 7]

$$V_{j\_up} = V_{j\_new}, V_{j\_low} = V_{j\_min} \text{ if } \Delta V_j < 0$$

$$V_{j\_up} = V_{j\_max}, V_{j\_low} = V_{j\_new} \text{ else} \quad \text{Equation (7)}$$

Here, $V_{j\_up}$ denotes an upper limit at the voltage measuring point j. Furthermore, $V_{j\_low}$ denotes a lower limit at the voltage measuring point j. Furthermore, $V_{j\_max}$ denotes an upper limit of a predetermined voltage range. Furthermore, $V_{j\_min}$ in denotes a lower limit of the predetermined voltage range. Furthermore, $V_{j\_new}$ denotes a voltage value at a voltage measuring point calculated at Step S308 when the change in reactive power is output. Furthermore, $\Delta V_j$ denotes a change in voltage at the voltage measuring point calculated at Step S308. Here, Equation (7) is present as many as m indicating the number of the voltage measuring points (m=n according to Embodiment) as Equation (6).

Finally, at Step S310, the notification unit 205 transmits the control variable calculated by the control variable calculating unit 204 at Step S309 to the power adjustment apparatuses 105. Then, the processes proceed to Step S302.

According to Embodiment, the voltage control using reactive power is mainly described. However, when the power adjustment apparatus 105 is, for example, a distributed generation, the power adjustment apparatus 105 can output active power by itself. Here, the voltage control apparatus 201 may calculate a control variable so that the voltage value at the voltage measuring point falls within a predetermined voltage range, using the active power.

Specifically, at Step S307, the control variable calculating unit 204 calculates a change in active power value ($\Delta P$) to be output by each of the power adjustment apparatuses 105, with the obtained voltage values and system impedances using Equations (8) and (9), instead of Equations (1) and (2).

[Math. 8]

$$\sum_{i=1}^{n} \beta_{hi} \cdot \Delta P_i \geq \Delta V_h \quad \text{Equation (8)}$$

[Math. 9]

$$\Delta P_{i\_min} \leq \Delta P_i \leq \Delta P_{i\_max} \quad \text{Equation (9)}$$

Here, n denotes the number of the power adjustment apparatuses 105. Furthermore, $\Delta P_i$ denotes a change in active power to be output by the power adjustment apparatus identified by the identifier i. Furthermore, $\Delta V_h$ denotes a voltage control quantity at a voltage measuring point. Here, $\Delta V_h$=(upper (lower) limit of a predetermined voltage range)–(voltage value $V_h$ at the voltage measuring point 103). The symbol h is an identifier representing the voltage measuring point to be controlled (voltage value deviates from a predetermined voltage range), and can satisfy 1≤h≤m indicating the number of voltage measuring points. Thus, Equation (8) is present as many as the number of voltage measuring points at each of which the voltage value deviates from a predetermined voltage range. Although h is the identifier representing the voltage measuring point to be controlled (voltage value deviates from a predetermined voltage range) according to Embodiment, it may be an identifier representing all of the voltage measuring points not to be controlled.

Furthermore, $\beta_{hi}$ is a coefficient representing control sensitivity (=$dV_h/dP_i$), and is calculated based on the system impedance obtained by the impedance obtainment unit 203. Specifically, for example, $\beta_{hi}$ can be calculated by the following Equation (10).

[Math. 10]

$$\beta_{hi} = \frac{\min(r_i, r_h)}{V_h} \quad \text{Equation (10)}$$

Here, $r_i$ denotes a value of resistance component under the system impedance obtained by the impedance obtainment unit 203, and is a resistance from the distribution substation 101 to the power adjustment apparatus 105 identified by the identifier i. Furthermore, $r_h$ denotes a resistance from the distribution substation 101 to the voltage measuring point 103 identified by an identifier h.

Here, $\beta_{hi}$ can be determined by measuring a voltage change $\Delta V_h$ at the voltage measuring point 103 identified by the identifier h when the power adjustment apparatus 105 identified by the identifier i changes output of active power by $\Delta P_i$.

Furthermore, $\Delta P_{i\_max}$ denotes the maximum value of the change in active power. Furthermore, $\Delta P_{i\_min}$ in denotes the minimum value of the change in active power. Thus, Equation (9) is present as many as n indicating the number of the power adjustment apparatuses 105.

According to Embodiment, m=n because each of the voltage measuring points is connected to a corresponding one of the power adjustment apparatuses 105.

Next, at Step S308, the control variable calculating unit 204 calculates a change in voltage at the voltage measuring point when the change in active power calculated at Step S307 is output, using the following Equation (11) instead of Equation (4). The voltage value at the voltage measuring point when the change in active power is output is calculated using Equation (5).

[Math. 11]

$$\Delta V_j = \sum_{i=1}^{n} \beta_{ji} \cdot \Delta P_i \quad \text{Equation (11)}$$

Here, n denotes the number of the power adjustment apparatuses 105. Furthermore, $\Delta P_i$ denotes a change in active power (a) to be output by the power adjustment apparatus identified by the identifier i and (b) calculated at Step S307. Furthermore, $\beta_{ji}$ is a coefficient representing control sensitivity (=$dV_j/dP_i$). Furthermore, $\Delta V_j$ denotes a change in voltage at the voltage measuring point 103 when the change in active power calculated at Step S307 is output.

Here, j is an identifier representing the voltage measuring point 103 (i=j according to Embodiment). Furthermore, Equation (11) is present as many as m indicating the number of the voltage measuring points 103 (m=n according to Embodiment).

At Step S309, the control variable calculating unit 204 calculates one of the upper limit and the lower limit of the voltage at each of the voltage measuring points 103 as a control variable, based on the change in active power calculated at Step S307, using the following Equation (12) instead of Equation (6).

[Math. 12]

$$V_{j\_up}=V_{j\_new}, V_{j\_low}=V_{min} \text{ if } \Delta P_i<0$$

$$V_{j\_up}=V_{max}, V_{j\_low}=V_{j\_new} \text{ else} \quad \text{Equation (12)}$$

Here, $V_{j\_up}$ denotes an upper limit at the voltage measuring point j. Furthermore, $V_{j\_low}$ denotes a lower limit at the voltage measuring point j. Furthermore, $V_{j\_max}$ denotes an upper limit of a predetermined voltage range. Furthermore, $V_{j\_min}$ denotes a lower limit of the predetermined voltage range. Furthermore, $V_{j\_new}$ denotes a voltage value at the voltage measuring point 103 calculated at Step S308 when the change in active power is output. Furthermore, $\Delta P_i$ denotes a change in active power (a) to be output by the power adjustment apparatus 105 identified by the identifier i and (b) calculated at Step S307.

Specifically, the control variable calculating unit 204 may calculate a change in reactive power value to be output by each of the power adjustment apparatuses 105 based on the voltage value at the one or more voltage measuring points 103 and the system impedances so that the voltage values at the voltage measuring points 103 fall within a predetermined voltage range and a sum of absolute values of the reactive powers output from the power adjustment apparatuses 105 falls below a predetermined value, and calculate the voltage value at the first voltage measuring point corresponding to the power adjustment apparatus 105 and a change in voltage value at the first voltage measuring point when the power adjustment apparatus 105 outputs the calculated change in reactive power value. Here, the predetermined value may be the minimum value or a predetermined threshold.

Here, when the change in voltage value increases the voltage at the corresponding first voltage measuring point, the control variable calculating unit 204 may determine the calculated voltage value at the first voltage measuring point to be the possible lower limit of the voltage value at the first voltage measuring point. Furthermore, when the change in voltage value decreases the voltage at the corresponding first voltage measuring point, the control variable calculating unit 204 may determine the calculated voltage value at the first voltage measuring point to be the possible upper limit of the voltage value at the first voltage measuring point.

At Step S309, the control variable calculating unit 204 may calculate one of the upper limit and the lower limit of the voltage at each of the voltage measuring points as a control variable, based on the change in voltage at the voltage measuring point calculated at Step S308, using the following Equation (7) instead of Equation (12).

Next, the operating intervals of the voltage control apparatus 201 and the power adjustment apparatuses 105 will be described with reference to FIGS. 4A and 4B to describe the advantages in using the voltage control apparatus according to Embodiment.

FIG. 4A conceptually illustrates command intervals of a conventional voltage control apparatus of a coordination control type, and output adjustment intervals (also referred to as "local control intervals") of a conventional power adjustment apparatus of the coordination control type. In FIG. 4A, the two horizontal arrows represent time axes of the command intervals and the local control intervals. Time elapses as the arrow moves to the right.

The intervals of vertical arrows in the upper time axis represent the command intervals of the conventional voltage control apparatus of the coordination control type. Furthermore, the intervals of vertical arrows in the lower time axis represent the local control intervals of the conventional power adjustment apparatus of the coordination control type.

As illustrated in FIG. 4A, the command intervals of the conventional voltage control apparatus of the coordination control type are the same as the local control intervals of the conventional power adjustment apparatus. Thus, when the conventional power adjustment apparatus cannot receive a control variable transmitted at a point in time (t) in the command intervals of the conventional voltage control apparatus, due to a delay in communication and others, the conventional power adjustment apparatus has to stop or output a reactive power value corresponding to a control variable received at a point in time (t−1). Here, when a voltage value at a voltage measuring point deviates from a predetermined voltage range due to variation in distributed generations or loads, the conventional power adjustment apparatus cannot output an appropriate reactive power value. Thus, the voltage value deviates from the proper voltage range, and the deviation value from the predetermined voltage range increases.

Figure 4B:
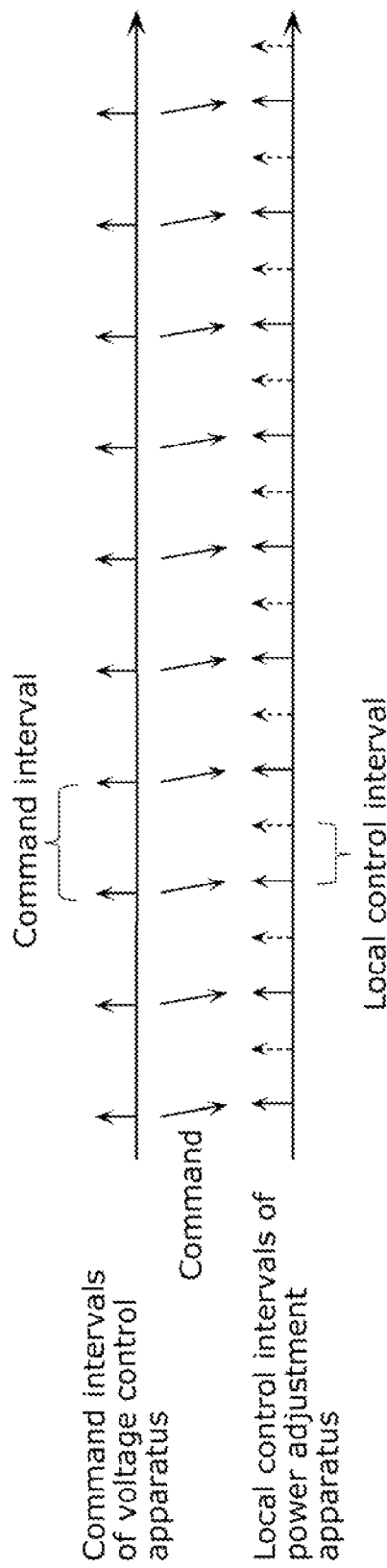
FIG. 4B illustrates command intervals of a voltage control apparatus and local control intervals of a power adjustment apparatus according to Embodiment.

FIG. 4B conceptually illustrates command intervals of the voltage control apparatus 201 and output adjustment intervals (local control intervals) of the power adjustment apparatus 105 according to Embodiment. In FIG. 4B, the two horizontal arrows represent time axes of the command intervals and the local control intervals. Time elapses as the arrow moves to the right.

The intervals of vertical arrows in the upper time axis represent the command intervals of the voltage control apparatus 201 according to Embodiment. Furthermore, the intervals of vertical arrows in the lower time axis represent the local control intervals of the power adjustment apparatus 105 according to Embodiment. Here, among the vertical arrows in the lower time axis, each of the solid arrows represents the control timing based on the control variable obtained from the voltage control apparatus 201. Furthermore, each of the dashed arrows represents timing at which the power adjustment apparatus 105 autonomously controls a voltage based on the obtained control variable.

As illustrated in FIG. 4B, the local control intervals of the power adjustment apparatus 105 can be set shorter than the command intervals of the voltage control apparatus 201 according to Embodiment. Specifically, as illustrated in FIG. 4B, the power adjustment apparatus 105 can autonomously adjust output of a voltage at the voltage measuring point to prevent the voltage value from deviating from a predetermined voltage range, with timing indicated by the dashed arrows, irrespective of the command intervals of the voltage control apparatus 201 according to Embodiment.

Next, the result of simulation of the voltage control in the distribution system performed by each of the conventional voltage control apparatus of the coordination control type and the voltage control apparatus 201 according to Embodiment will be described with reference to FIGS. 5A and 5B.

Figure 5A:
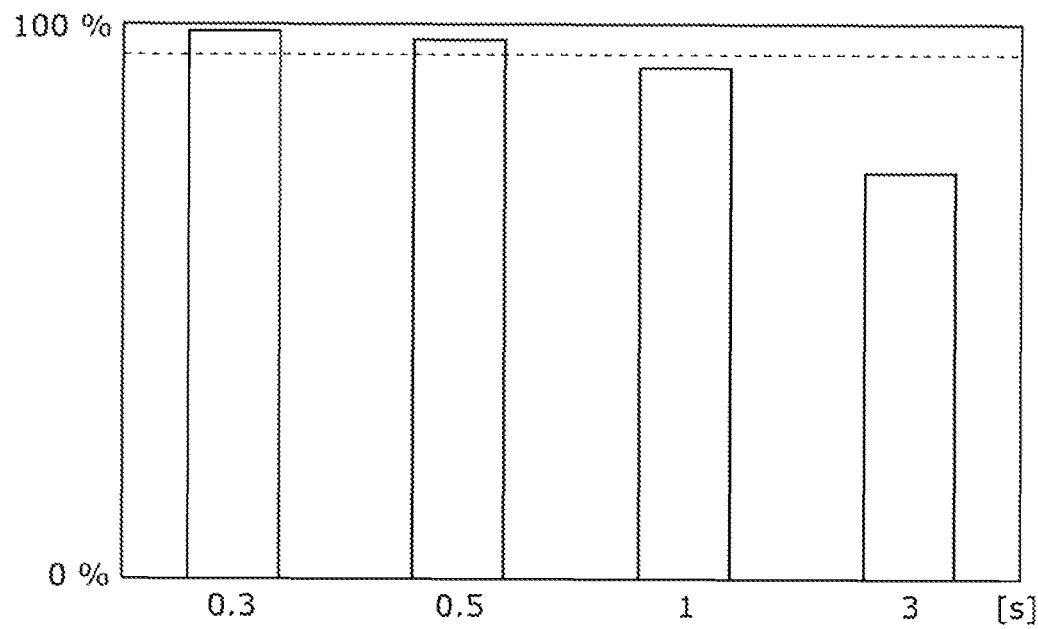
FIG. 5A shows an example of a result of simulation of voltage control performed by the conventional voltage control apparatus.

FIG. 5A shows an example of the result of simulation of the voltage control performed by the conventional voltage control apparatus. In FIG. 5A, the horizontal axis represents the command interval of the conventional voltage control apparatus (0.3 to 3 seconds). The vertical axis represents a predetermined-voltage-range maintaining percentage that is a percentage of voltage measuring points at which the voltage falls within a predetermined voltage range. Furthermore, the dashed line represents a proper voltage-range maintaining percentage that is a percentage of voltage measuring points at which the voltage falls within a proper voltage range. Specifically, the voltage control apparatus 201 needs to be controlled so that the predetermined-voltage-range maintaining percentage exceeds the dashed lines.

As indicated in FIG. 5A, the conventional voltage control apparatus can maintain at a voltage measuring point the predetermined-voltage-range maintaining percentage greater than the proper voltage-range maintaining percentage when the command interval is shorter than or equal to 0.5 second. However, when the command interval of the conventional voltage control apparatus is longer than or equal to 1 second, the predetermined-voltage-range maintaining percentage at the voltage measuring point significantly falls lower than the proper voltage-range maintaining percentage as the command interval is longer.

Figure 5B:
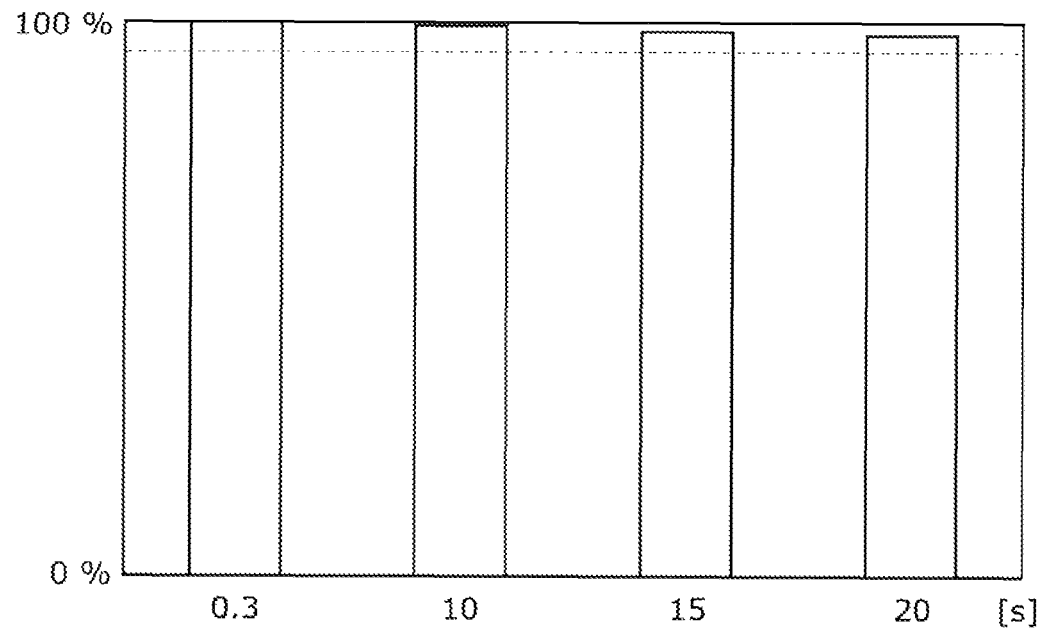
FIG. 5B shows an example of a result of simulation of voltage control performed by the voltage control apparatus according to Embodiment.

In contrast, FIG. 5B shows an example of the result of simulation of voltage control performed by the voltage control apparatus 201 according to Embodiment. In FIG. 5B, the horizontal axis represents the command interval of the voltage control apparatus 201 according to Embodiment (0.3 to 20 seconds). The vertical axis represents a predetermined-voltage-range maintaining percentage at a voltage measuring point. Furthermore, the dashed line represents a proper voltage-range maintaining percentage.

As indicated in FIG. 5B, the voltage control apparatus 201 according to Embodiment can maintain at a voltage measuring point the voltage-range maintaining percentage greater than the proper voltage-range maintaining percentage even when the command interval is 20 second. This is because the power adjustment apparatus 105 can autonomously adjust a voltage value at the voltage measuring point based on the control variable received at a point in time (t−1), even when it cannot receive the control variable transmitted from the voltage control apparatus 201 at a point in time (t) due to a delay in communication and others according to Embodiment.

Next, an example of procedure of the processing performed by the voltage control apparatus 201 according to Embodiment when all the voltage values at the voltage measuring points fall within a predetermined voltage range will be described with reference to FIG. 6.

Figure 6:
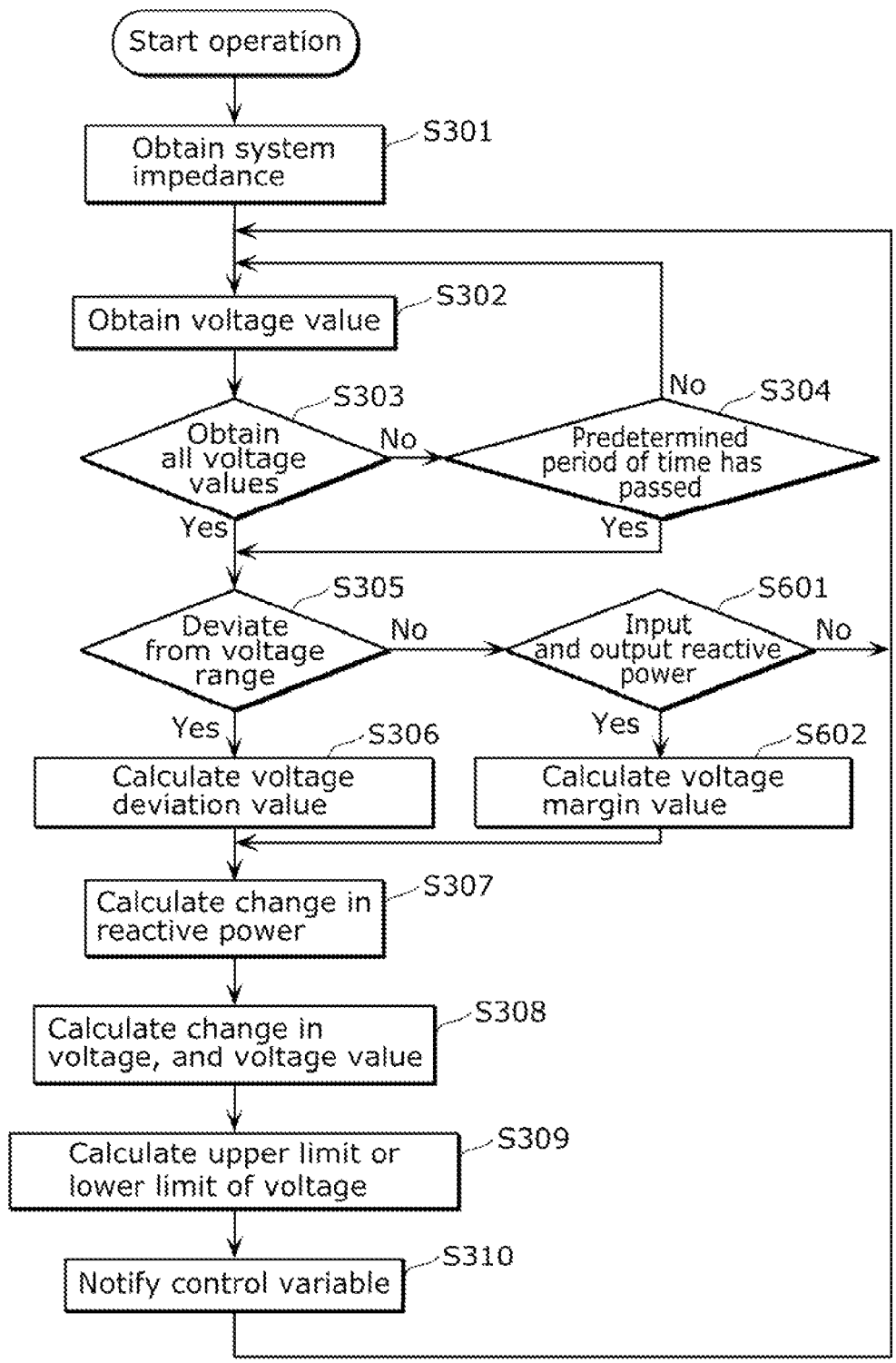
FIG. 6 is a flowchart of procedure of processing performed by the voltage control apparatus according to Embodiment.

FIG. 6 is a flowchart indicating the example of the procedure of the processing performed by the voltage control apparatus 201 according to Embodiment. The detailed description for FIG. 6 will be hereinafter omitted by using the same reference numerals as those of FIG. 3.

At Step S305 when all the obtained voltage values do not deviate from the predetermined voltage range (No at S305), the control variable calculating unit 204 proceeds to the process at Step S601.

At Step S601, the control variable calculating unit 204 verifies whether or not the power adjustment apparatuses 105 output reactive power. Here, when none of the power adjustment apparatuses 105 outputs reactive power (No at S601), the processes proceed to Step S302.

When the one or more power adjustment apparatuses 105 output reactive power (Yes at S601), the control variable calculating unit 204 calculates a voltage margin value, using the voltage value at the voltage measuring point 103 and an upper limit or a lower limit of a predetermined voltage range (S602). For example, when the upper limit of the predetermined voltage range is 107 V and the current voltage value is 103 V, the voltage margin value is 4 V.

Next, at Steps S307 to S309, the control variable calculating unit 204 calculates a control variable while maintaining the voltage margin value. Accordingly, output of unnecessary reactive power can be reduced.

Specifically, the control variable calculating unit 204 calculates at least one of the value corresponding to the upper limit and the value corresponding to the lower limit to expand an allowable voltage range indicated by the control variable, when all of the voltage values at the one or more voltage measuring points fall within the predetermined voltage range and at least one of the power adjustment apparatuses 105 outputs reactive power.

Next, the power adjustment apparatus 105 will be described in detail with reference to FIG. 7.

Figure 7:
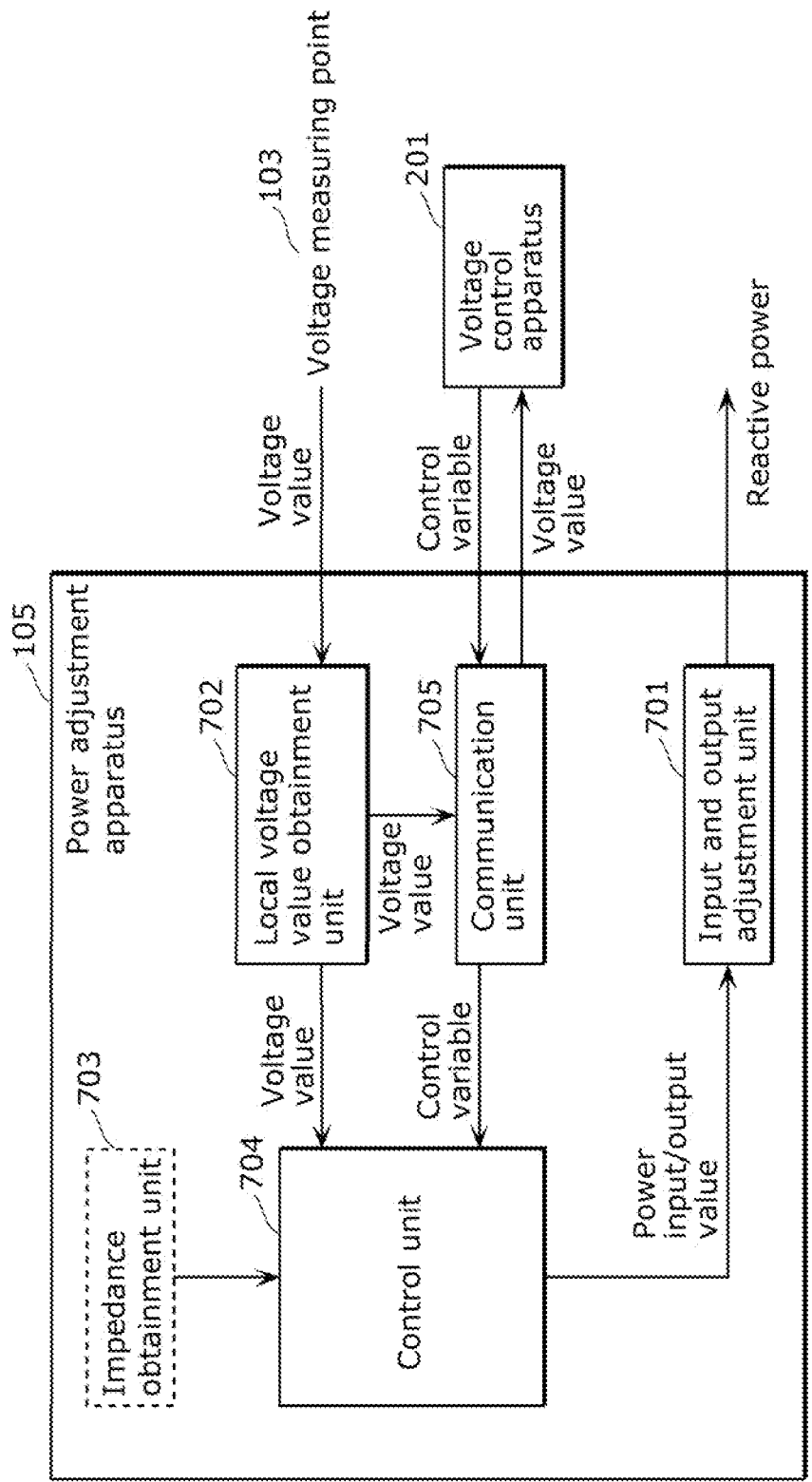
FIG. 7 is a block diagram of the power adjustment apparatus according to Embodiment.

FIG. 7 is a functional block diagram of the power adjustment apparatus 105 according to Embodiment.

As illustrated in FIG. 7, the power adjustment apparatus 105 includes an input and output adjustment unit 701, a local voltage value obtainment unit 702, an impedance obtainment unit 703, a control unit 704, and a communication unit 705.

The input and output adjustment unit 701 adjusts reactive power to be output, based on a reactive power value determined by the control unit 704. Specifically, the input and output adjustment unit 701 adjusts a power value to be output by the power adjustment apparatus 105, based on a power input/output value calculated by the control unit 704. Here, the input and output adjustment unit 701 adjusts a power value to be output by the power adjustment apparatus 105, at local control intervals.

The local voltage value obtainment unit 702 obtains a voltage value at the first voltage measuring point. Specifically, the local voltage value obtainment unit 702 obtains a voltage value measured at the voltage measuring point 103 connected to the power adjustment apparatus 105, and outputs the voltage value to the control unit 704.

The impedance obtainment unit 703 obtains a system impedance from the distribution substation 101 to the power adjustment apparatus 105 in the distribution system 100. The power adjustment apparatus 105 does not have to include the impedance obtainment unit 703. For example, the system impedance may be obtained from a server managed or operated by an electric power company. Furthermore, the communication unit 705 may receive the system impedance from the voltage control apparatus 201. Furthermore, a predetermined system impedance may be stored in, for example, a Read Only Memory (ROM) included in the power adjustment apparatus 105, and the impedance obtainment unit 703 may read the value. The system impedance may be obtained in not limited to these methods but the other methods.

When the voltage value obtained by the local voltage value obtainment unit 702 deviates from the voltage value range indicated by the control variable received by the communication unit 705, the control unit 704 determines the reactive power value to be output so that the voltage value obtained by the local voltage value obtainment unit 702 falls within the voltage value range indicated by the control variable. Specifically, the control unit 704 calculates an output value of the reactive power to be output by the input and output adjustment unit 701, based on the control variable received from the voltage control apparatus 201 by the communication unit 705, using the following Equation (13).

[Math. 13]
$$\Delta Q_i \geq \frac{1}{\alpha_{ii}} \cdot \Delta V_i \qquad \text{Equation (13)}$$

Here, $\Delta Q_i$ denotes a change in reactive power to be output by the power adjustment apparatus 105 identified by an identifier i. In other words, $\Delta Q_i$ is a solution solved by the control unit 704. Furthermore, $\alpha_{ji}$ is a coefficient representing control sensitivity ($=dV_j/dQ_i$), and is calculated based on the system impedance obtained by the impedance obtainment unit 703. Furthermore, $\Delta V_i$ is a difference between the voltage value obtained by the local voltage value obtainment unit 702 and the upper limit or the lower limit stored by the communication unit 705.

According to Embodiment, the example of controlling the voltage value using reactive power is mainly described. However, when the power adjustment apparatus 105 is, for example, a distributed generation, the power adjustment apparatus 105 can output active power by itself. Here, the control unit 704 can control the voltage value at the voltage measuring point to fall within a predetermined voltage range by transmitting the output value of the active power to the input and output adjustment unit 701 and adjusting the active power to be output.

Specifically, the control unit 704 may calculate the output value of the active power adjusted by the input and output adjustment unit 701, using the following Equation (14) instead of Equation (13).

[Math. 14]
$$\Delta P_i \leq \frac{1}{\beta_{ii}} \cdot \Delta V_i \qquad \text{Equation (14)}$$

Here, $\Delta P_i$ denotes a change in active power to be output by the power adjustment apparatus 105 identified by the identifier i. In other words, $\Delta P_i$ is a solution solved by the control unit 704. Furthermore, $\beta_{ji}$ is a coefficient representing control sensitivity ($=dV_j/dP_i$), and is calculated based on the system impedance obtained by the impedance obtainment unit 703. Furthermore, $\Delta V_i$ is a difference between the voltage value obtained by the local voltage value obtainment unit 702 and the upper limit or the lower limit stored by the communication unit 705.

When the voltage value obtained by the local voltage value obtainment unit 702 deviates from the voltage value range indicated by the control variable received by the communication unit 705, the control unit 704 may determine the active power value to be output so that the voltage value obtained by the local voltage value obtainment unit 702 falls within the voltage value range indicated by the control variable. The input and output adjustment unit 701 adjusts active power to be output, based on the active power value determined by the control unit 704.

According to Embodiment, reactive power and active power are separately described. However, when the voltage value obtained by the local voltage value obtainment unit 702 deviates from the voltage value range indicated by the control variable received by the communication unit 705, the power adjustment apparatus 105 may further determine the active power value and the reactive power value to be output so that the voltage value obtained by the local voltage value obtainment unit 702 falls within the voltage value range indicated by the control variable.

Furthermore, the control unit 704 may adjust both of the active power and the reactive power to be output so that a power factor ($=P/\sqrt{(P^2+Q^2)}$) falls within a proper range. Furthermore, the control unit 704 may adjust the active power value and the reactive power value to be output so as not to exceed a rated value ($=\sqrt{(P^2+Q^2)}$).

The communication unit 705 receives, from the voltage control apparatus 201, a control variable including at least one of (a) a value corresponding to an allowable upper limit of a voltage value at a first voltage measuring point and (b) a value corresponding to an allowable lower limit of the voltage value at the first voltage measuring point.

Specifically, the communication unit 705 outputs, to the control unit 704, the control variable received from the voltage control apparatus 201 through the communication line 106. Furthermore, the communication unit 705 transmits the voltage value obtained by the local voltage value obtainment unit 702 to the voltage control apparatus 201 through the communication line 106. The communication unit 705 may obtain the voltage value obtained by the local voltage value obtainment unit 702 from the control unit 704, and transmit the voltage value to the voltage control apparatus 201. Furthermore, the communication unit 705 may receive an output value of reactive power from the control unit 704, and transmit the output value to the voltage control apparatus 201.

In the distribution system 100 according to Embodiment, the voltage measuring points may include a voltage measuring point that is not connected to a corresponding one of the power adjustment apparatuses 105.

In other words, the distribution system 100 includes the one or more voltage measuring points, the one or more voltage measuring points includes the first voltage measuring point connected to a corresponding one of the power adjustment apparatuses 105, and a second voltage measuring point that is a voltage measuring point different from the first voltage measuring point and that is not connected to a corresponding power adjustment apparatus among the power adjustment apparatuses 105, and the control variable calculating unit 204 may be configured to calculate the control variable to prevent the voltage value at the first voltage measuring point and a voltage value at the second voltage measuring point from deviating from the predetermined voltage range.

Next, another distribution system will be described in detail with reference to FIG. 8.

Figure 8:
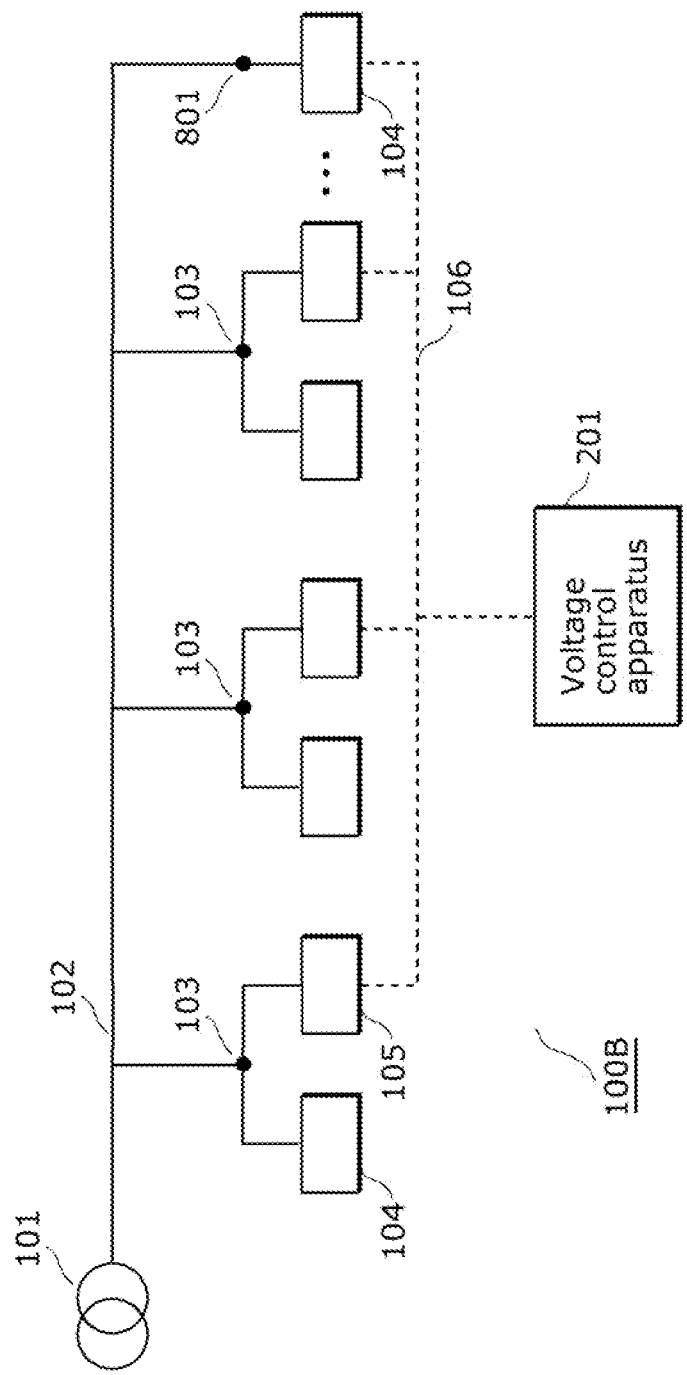
FIG. 8 illustrates a configuration of the distribution system according to Embodiment.

FIG. 8 conceptually illustrates a distribution system 100B including a voltage control apparatus 201. The detailed description for FIG. 8 will be hereinafter omitted by using the same reference numerals as those of FIG. 1.

As illustrated in FIG. 8, in the distribution system 100B, a voltage measuring point 801 to which the power adjustment apparatus 105 is not connected is the most distant from the distribution substation 101. The voltage measuring point 801 is a point at which a voltage value is detected. For example, the voltage measuring point 801 is a point at which the load 104, the voltage control apparatus 201, or others can obtain a voltage value from a voltage sensor using communication and others, or a connection point and others.

As illustrated in FIG. 8, the load 104 measures a voltage at the voltage measuring point 801 according to Embodiment. Furthermore, the voltage control apparatus 201 obtains a voltage value at the voltage measuring point 801 through the load 104. The voltage value obtainment unit 202 obtains the voltage value at the voltage measuring point 801 as well as the voltage value at the voltage measuring point 103.

With the configuration, the voltage control apparatus 201 can calculate the upper limit and the lower limit of the voltage value at the voltage measuring point 103 so that the voltage value at the voltage measuring point 801 to which the power adjustment apparatus 105 is not connected falls within a predetermined voltage range.

Although the load 104 that is the most distant from the distribution substation 101 measures the voltage according to Embodiment and the voltage value obtainment unit 202 receives the voltage value through the communication line 106, the operations are not limited to such.

Furthermore, as illustrated in FIG. 8, the second voltage measuring point to which the power adjustment apparatus 105 is not connected is the most distant from the distribution substation 101 on the distribution line 102. However, the second voltage measuring point is not limited to such. For example, the second voltage measuring point may be the closest to the distribution substation 101 on the distribution line 102, and at other positions.

Although the number of the voltage control apparatuses 201 is one according to Embodiment, the voltages at the one or more voltage measuring points in the distribution system can be adjusted using the voltage control apparatuses 201 to prevent the voltages from deviating from a predetermined voltage range.

Specifically, for example, one voltage control apparatus 201 may be provided for each area. Here, the area is under (to the right of) the distribution substation 101 in FIG. 1. Furthermore, the area may be under the voltage measuring point 103 in FIG. 1. Furthermore, although the number of the distribution line 102 is only one in FIG. 1, when the number is plural, a group of apparatuses connected to the respective distribution lines 102 may be an area.

Furthermore, in FIG. 1, when a transformer is included between the distribution line 102 and the voltage measuring point 103 (the distribution line 102 is at high pressure and the units under the transformer are at low pressure), the voltage at each of the voltage measuring points 103 can be adjusted to prevent the voltage from deviating from the predetermined voltage range by arranging (i) the voltage control apparatus 201 that controls a voltage value (not illustrated in FIG. 1) at a voltage measuring point on the high-pressure distribution line 102 and (ii) the one or more voltage control apparatuses 201 that control the voltage values at the voltage measuring points 103 under the transformer. First, the voltage control apparatus 201 that controls the high pressure determines at least one of the value corresponding to the upper limit and the value corresponding to the lower limit, of the voltage at the high-pressure voltage measuring point to calculate a control variable. The voltage control apparatus 201 that controls the high pressure transmits the calculated control variable to the voltage control apparatus 201 that controls the low pressure. Next, the voltage control apparatus 201 that controls the low pressure converts the received control variable into a value of the low pressure. The voltage control apparatus 201 that controls the low pressure determines at least one of the value corresponding to the upper limit and the value corresponding to the lower limit of the voltage at each of the voltage measuring points 103 to calculate the control variable. The voltage control apparatus 201 that controls the low pressure transmits the calculated control variable to the power adjustment apparatuses 105. Finally, each of the power adjustment apparatuses 105 adjusts at least one of the active power and the reactive power to prevent the voltage value at the voltage measuring point 103 from deviating from the voltage value range indicated by the received control variable.

The present invention is described based on, but not limited to, Embodiments. The present invention includes the following cases.

(1) Each of the apparatuses can be implemented by a computer system including a microprocessor, a ROM, a RAM, a hard disk unit, a display unit, a keyboard, and a mouse. The RAM or the hard disk unit stores a computer program. The microprocessor operates according to the computer program, so that each of the apparatuses fulfills the functions. Here, the computer program is a combination of instruction codes each indicating an instruction to a computer to implement a predetermined function.

(2) A part of or an entire of the constituent elements included in each of the apparatuses may be configured of a system Large Scale Integration (LSI). The system LSI is a super multi-functional LSI manufactured by Integrating the constituent elements into a single chip. More specifically, the system LSI is a computer system including a microprocessor, a ROM, and a RAM. The ROM stores a computer program. The microprocessor loads the computer program from the ROM to the RAM and operates such as performing an operation according to the loaded computer program, so that the system LSI fulfills the functions.

(3) Furthermore, a part or an entire of the constituent elements included in each of the apparatuses may be configured of an IC card or a single module detachable from the apparatus. The IC card or the module is a computer system including the microprocessor, the ROM, and the RAM. The IC card or the module may include the super multi-functional LSI. The microprocessor operates according to the computer program, so that each of the IC card and the module fulfills the functions. The IC card or the module may have tamper-resistance.

(4) The present invention may be implemented by any of the above methods. Furthermore, these methods may be implemented by causing a computer to execute a computer program, and by a digital signal included in the computer program.

Moreover, the present invention may be implemented by recording the computer program or the digital signal on a computer-readable recording medium, for example, a flexible disk, a hard disk, a CD-ROM, an MO, a DVD, a DVD-ROM, a DVD-RAM, a Blu-ray Disc (BD)®, and a semiconductor memory. Moreover, the present invention may be implemented by the digital signal recorded on these recording media.

Moreover, the present invention may be implemented by transmitting the computer program or the digital signal via an electronic communication line, a wireless or wired communication line, a network represented by the Internet, data broadcasting, and the like.

Moreover, the present invention may be a computer system including a microprocessor and a memory. The memory may store the computer program, and the microprocessor may operate according to the computer program.

Furthermore, the present invention may be implemented by another independent computer system by recording the computer program or the digital signal on the recording media and transporting the recording media, or by transmitting the computer program or the digital signal via a network and the like.

(5) Embodiments and modifications may be combined.

Embodiments disclosed this time are exemplifications in all respects, and should be regarded as not limiting the scope of the present invention. The scope of the present invention is indicated not by the description but by Claims, and is intended to include all the modifications within Claims, meanings of equivalents, and the scope of the equivalents.

More specifically, the present invention is not limited to Embodiments. Without departing from the scope of the present invention, the present invention includes an embodiment with some modifications on Embodiments conceived by a person skilled in the art, and another embodiment obtained through combinations of the constituent elements of different Embodiments in the present invention.

INDUSTRIAL APPLICABILITY

The present invention is applicable to a voltage control apparatus that adjusts voltages at the one or more voltage measuring points provided in the distribution system to prevent the voltages from deviating from a predetermined voltage range by controlling the power adjustment apparatuses.

REFERENCE SIGNS LIST 100, 100B Distribution system
101 Distribution substation
102 Distribution line
103, 801 Voltage measuring point
104 Load
105 Power adjustment apparatus
106 Communication line
201 Voltage control apparatus
202 Voltage value obtainment unit
203 Impedance obtainment unit
204 Control variable calculating unit
205 Notification unit
701 Input and output adjustment unit
702 Local voltage value obtainment unit
703 Impedance obtainment unit
704 Control unit
705 Communication unit

The invention claimed is:

1. A voltage control apparatus that adjusts voltages at one or more voltage measuring points provided in a distribution system to prevent the voltages from deviating from a predetermined voltage range by controlling power adjustment apparatuses, the voltage control apparatus comprising:
a voltage value obtainment unit configured to obtain voltage values at the one or more voltage measuring points including a first voltage measuring point connected to a corresponding one of the power adjustment apparatuses;
an impedance obtainment unit configured to obtain a system impedance from a distribution substation to each of the power adjustment apparatuses in the distribution system;
a control variable calculating unit configured to calculate a control variable including at least one of (i) an allowable upper limit of a voltage value at the first voltage measuring point and (ii) an allowable lower limit of the voltage value at the first voltage measuring point, based on the voltage values at the one or more voltage measuring points and the system impedances; and
a notification unit configured to notify the power adjustment apparatuses of the calculated control variable.

2. The voltage control apparatus according to claim 1,
wherein the distribution system includes the one or more voltage measuring points,
the one or more voltage measuring points includes the first voltage measuring point, and a second voltage measuring point that is not connected to a corresponding power adjustment apparatus among the power adjustment apparatuses, and
the control variable calculating unit is configured to calculate the control variable to prevent the voltage value at the first voltage measuring point and a voltage value at the second voltage measuring point from deviating from the predetermined voltage range.

3. The voltage control apparatus according to claim 1,
wherein the control variable calculating unit is configured to:
calculate a change in a reactive power value to be output by each of the power adjustment apparatuses, based on the voltage values at the one or more voltage measuring points and the system impedances to prevent the voltage values from deviating from the predetermined voltage range;
calculate the voltage value at the first voltage measuring point connected to the corresponding one of the power adjustment apparatuses, when the power adjustment apparatus outputs the calculated change in the reactive power value;
determine the calculated voltage value at the first voltage measuring point to be the allowable lower limit of the voltage value at the first voltage measuring point, when the output of the change in the reactive power value increases the voltage at the first voltage measuring point; and
determine the calculated voltage value at the first voltage measuring point to be the allowable upper limit of the voltage value at the first voltage measuring point, when the output of the change in the reactive power value decreases the voltage at the first voltage measuring point.

4. The voltage control apparatus according to claim 1,
wherein the control variable calculating unit is configured to:
calculate a change in a reactive power value to be output by each of the power adjustment apparatuses, based on the voltage values at the one or more voltage measuring points and the system impedances to prevent the voltage values from deviating from the predetermined voltage range;
calculate (i) the voltage value at the first voltage measuring point connected to the corresponding one of the power adjustment apparatuses and (ii) a change in the voltage value at the first voltage measuring point, when the power adjustment apparatus outputs the calculated change in the reactive power value;
determine the calculated voltage value at the first voltage measuring point to be the allowable lower limit of the voltage value at the first voltage measuring point, when the change in the voltage value increases the voltage at the first voltage measuring point; and
determine the calculated voltage value at the first voltage measuring point to be the allowable upper limit of the voltage value at the first voltage measuring point, when the change in the voltage value decreases the voltage at the first voltage measuring point.

5. The voltage control apparatus according to claim 1,
wherein when calculating, as the control variable, (i) the allowable upper limit of the voltage value at the first voltage measuring point and (ii) the allowable lower limit of the voltage value at the first voltage measuring point, the control variable calculating unit is configured to:
determine a lower limit of the predetermined voltage range to be the allowable lower limit, in the case where the allowable upper limit is first calculated; and
determine an upper limit of the predetermined voltage range to be the allowable upper limit, in the case where the allowable lower limit is first calculated.

6. The voltage control apparatus according to claim 1, wherein the control variable calculating unit is configured to:
determine an upper limit of the predetermined voltage range to be the allowable upper limit, when the allowable upper limit exceeds the upper limit of the predetermined voltage range; and
determine a lower limit of the predetermined voltage range to be the allowable lower limit, when the allowable lower limit falls below the lower limit of the predetermined voltage range.

7. The voltage control apparatus according to claim 1, wherein the control variable calculating unit is configured to calculate at least one of the allowable upper limit and the allowable lower limit to further expand an allowable voltage range indicated by the control variable, when the voltage values at the one or more voltage measuring points fall within the predetermined voltage range and at least one of the power adjustment apparatuses inputs and outputs reactive power.

8. The voltage control apparatus according to claim 1, wherein the control variable calculating unit is configured to calculate, as the control variable, at least one of an allowable lower limit and an allowable upper limit of a reactive power value to be output by the corresponding one of the power adjustment apparatuses connected to the first voltage measuring point.

9. A power adjustment apparatus, comprising:
a local voltage value obtainment unit configured to obtain a voltage value at a first voltage measuring point;
a communication unit configured to receive a control variable including at least one of (i) an allowable upper limit of a voltage value at the first voltage measuring point and (ii) an allowable lower limit of the voltage value at the first voltage measuring point, from the voltage control apparatus according to claim 1;
a control unit configured to determine a reactive power value to be output so that the voltage value obtained by the local voltage value obtainment unit falls within a voltage value range, when the voltage value obtained by the local voltage value obtainment unit deviates from the voltage value range, the voltage value range being indicated by the control variable received by the communication unit; and
an input and output adjustment unit configured to adjust reactive power to be output, based on the reactive power value determined by the control unit.

10. The power adjustment apparatus according to claim 9, wherein the control unit is further configured to determine an active power value to be output so that the voltage value obtained by the local voltage value obtainment unit falls within the voltage value range, when the voltage value obtained by the local voltage value obtainment unit deviates from the voltage value range, the voltage value range being indicated by the control variable received by the communication unit, and
the input and output adjustment unit is configured to adjust active power to be output, based on the active power value determined by the control unit.

11. A voltage control method for adjusting voltages at one or more voltage measuring points provided in a distribution system to prevent the voltages from deviating from a predetermined voltage range by controlling power adjustment apparatuses, the voltage control method comprising:
obtaining voltage values at the one or more voltage measuring points including a first voltage measuring point connected to a corresponding one of the power adjustment apparatuses;
obtaining a system impedance from a distribution substation to each of the power adjustment apparatuses in the distribution system;
calculating a control variable including at least one of (i) an allowable upper limit of a voltage value at the first voltage measuring point and (ii) an allowable lower limit of the voltage value at the first voltage measuring point, based on the voltage values at the one or more voltage measuring points and the system impedances; and
notifying the power adjustment apparatuses of the calculated control variable.

12. A non-transitory computer-readable recording medium on which a program is recorded, the program causing a computer to execute the voltage control method according to claim 11.

13. An integrated circuit that adjusts voltages at one or more voltage measuring points provided in a distribution system to prevent the voltages from deviating from a predetermined voltage range by controlling power adjustment apparatuses, the integrated circuit comprising:
a voltage value obtainment unit configured to obtain voltage values at the one or more voltage measuring points including a first voltage measuring point connected to a corresponding one of the power adjustment apparatuses;
an impedance obtainment unit configured to obtain a system impedance from a distribution substation to each of the power adjustment apparatuses in the distribution system;
a control variable calculating unit configured to calculate a control variable including at least one of (i) an allowable upper limit of a voltage value at the first voltage measuring point and (ii) an allowable lower limit of the voltage value at the first voltage measuring point, based on the voltage values at the one or more voltage measuring points and the system impedances; and
a notification unit configured to notify the power adjustment apparatuses of the calculated control variable.

* * * * *